United States Patent
Alves Ferreira et al.

(10) Patent No.: US 11,988,439 B2
(45) Date of Patent: May 21, 2024

(54) REFRIGERATOR APPLIANCE SUBCOMPONENT MOUNTING SYSTEM

(71) Applicant: WHIRLPOOL CORPORATION, Benton Harbor, MI (US)

(72) Inventors: Luiz Afranio Alves Ferreira, Joinville (BR); Vinicius Bianchezzi, Joinville (BR); Ualisson Ferreira Da Silva, Joinville (BR); Francisco De Sena, Jr., Joinville (BR); Acácio Da Silva, Jr., Joinville (BR); Lucas F Lonni, Joinville (BR)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 17/851,632

(22) Filed: Jun. 28, 2022

(65) Prior Publication Data
US 2023/0417478 A1   Dec. 28, 2023

(51) Int. Cl.
*F25D 23/06* (2006.01)
*F16B 33/00* (2006.01)
*F16B 37/04* (2006.01)

(52) U.S. Cl.
CPC ............ *F25D 23/062* (2013.01); *F16B 33/00* (2013.01); *F16B 37/042* (2013.01); *F25D 23/067* (2013.01)

(58) Field of Classification Search
CPC .... F25D 23/064; F25D 23/065; F25D 23/066; F25D 23/067; F16B 37/042; F16B 33/00; F16B 33/002; F16B 21/086
See application file for complete search history.

(56) References Cited

U.S. PATENT DOCUMENTS

| | | | | |
|---|---|---|---|---|
| 2,940,711 A | * | 6/1960 | Peters | F25D 23/067 248/327 |
| 3,131,742 A | * | 5/1964 | Munse | F16B 37/02 411/301 |
| 3,300,169 A | | 1/1967 | Fisher | |
| 3,534,797 A | * | 10/1970 | Haug | F16B 5/0258 411/970 |
| 3,826,458 A | * | 7/1974 | Fisher | F16B 13/04 411/173 |

(Continued)

FOREIGN PATENT DOCUMENTS

| | | | |
|---|---|---|---|
| CN | 202126135 U | * | 1/2012 |
| CN | 106871554 A | * | 6/2017 |

(Continued)

*Primary Examiner* — Kimberley S Wright
(74) *Attorney, Agent, or Firm* — Brooks Kushman P.C.

(57) ABSTRACT

An anchor assembly for securing a subcomponent to a refrigerator includes a receiving portion and a cover portion. The receiving portion has a first end configured to engage the subcomponent, a second end defining threads, and tabs extending radially outward at a position that is between the first and second ends. The cover portion has a hub and a skirt extending radially outward from the hub. The hub is configured to engage the second end of the receiving portion via the threads to secure the second portion to the first portion. The skirt is configured to engage a wall and extend about the keyed-orifice. The tabs and skirt are collectively configured to generate a compression force on the wall to secure the anchor assembly to the wall.

20 Claims, 6 Drawing Sheets

(56) References Cited

U.S. PATENT DOCUMENTS

| | | | | |
|---|---|---|---|---|
| 3,917,206 A * | 11/1975 | Fisher | F25D 23/067 | 411/15 |
| 4,176,428 A * | 12/1979 | Kimura | B60R 13/0206 | 411/509 |
| 4,293,261 A * | 10/1981 | Frano | F16B 37/02 | 411/85 |
| 4,325,178 A * | 4/1982 | Pruehs | F16B 37/04 | 411/116 |
| 4,716,633 A * | 1/1988 | Rizo | B60R 13/0206 | 24/297 |
| 4,752,171 A * | 6/1988 | Pliml, Jr. | B29C 65/069 | 411/181 |
| 4,925,350 A * | 5/1990 | Kolseth | F25D 23/064 | 411/82 |
| 5,361,599 A * | 11/1994 | Dasher | F25D 23/067 | 62/298 |
| 6,729,705 B2 * | 5/2004 | Wolanin | F25D 23/067 | 312/351 |
| 7,731,315 B2 * | 6/2010 | Lee | F25D 23/067 | 312/406 |
| 10,233,959 B2 * | 3/2019 | Waichulis | F16B 37/043 | |
| 11,397,037 B2 * | 7/2022 | Reddy | F25D 11/02 | |
| 2004/0263038 A1 * | 12/2004 | Ribolzi | F25D 25/02 | 312/408 |
| 2007/0228236 A1 * | 10/2007 | MacKay | A47B 57/06 | 248/205.3 |
| 2008/0180013 A1 * | 7/2008 | Lee | F25D 23/064 | 312/406 |
| 2012/0043874 A1 * | 2/2012 | Simpson | F25D 23/067 | 312/408 |
| 2016/0025405 A1 * | 1/2016 | Park | F25D 23/065 | 312/406.1 |
| 2016/0245324 A1 * | 8/2016 | Kilgore | F16B 37/041 | |
| 2017/0108023 A1 * | 4/2017 | Waichulis | F16B 37/043 | |
| 2018/0172339 A1 * | 6/2018 | Lindel | F25D 23/066 | |
| 2020/0096249 A1 | 3/2020 | Lindel et al. | | |
| 2020/0248945 A1 * | 8/2020 | Reddy | F25D 23/067 | |

FOREIGN PATENT DOCUMENTS

| | | | | |
|---|---|---|---|---|
| CN | 108917261 A | * | 11/2018 | |
| EP | 4000462 A1 | * | 5/2022 | A47B 96/024 |

* cited by examiner

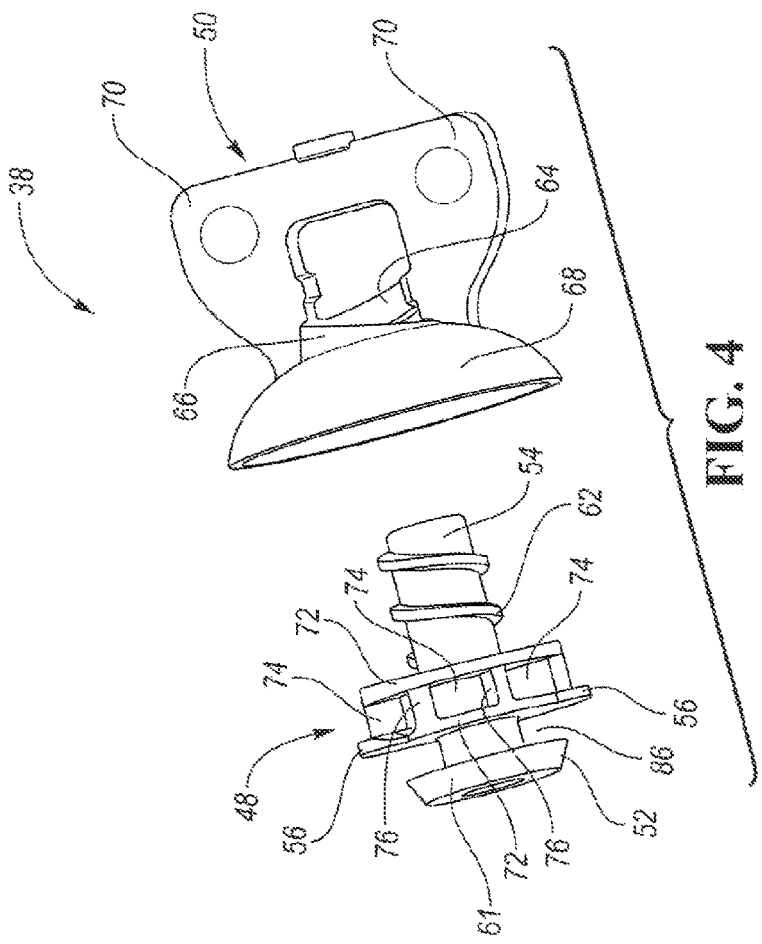
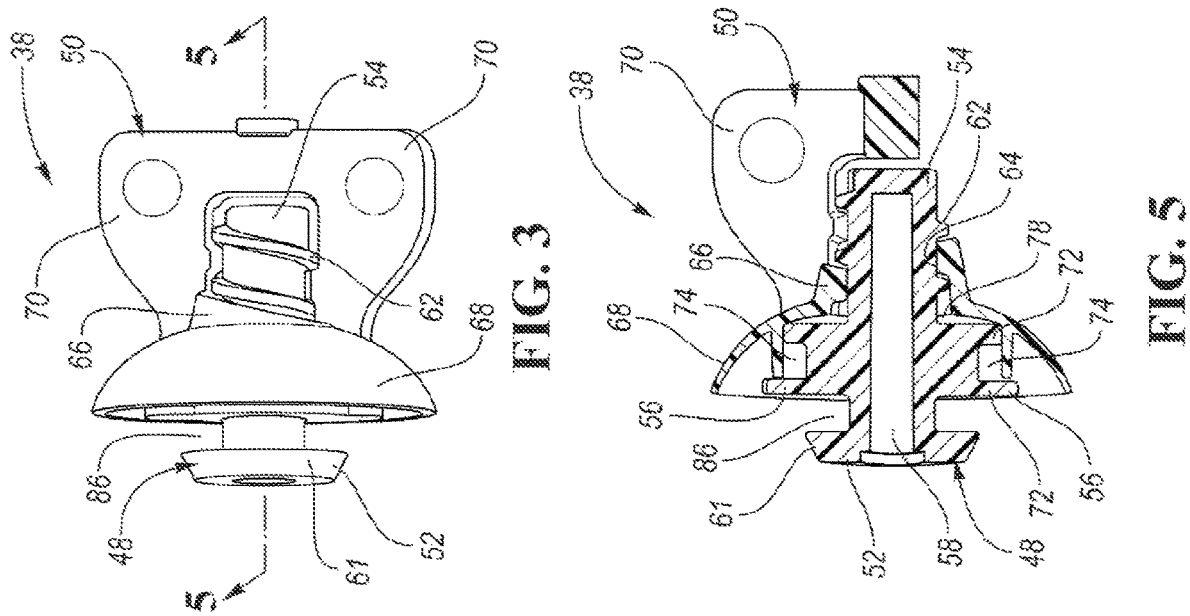

REFRIGERATOR APPLIANCE SUBCOMPONENT MOUNTING SYSTEM

TECHNICAL FIELD

The present disclosure relates to an appliance such as a refrigerator.

BACKGROUND

In order to keep food fresh, a low temperature must be maintained within a refrigerator to reduce the reproduction rate of harmful bacteria. Refrigerators circulate refrigerant and change the refrigerant from a liquid state to a gas state by an evaporation process in order cool the air within the refrigerator. During the evaporation process, heat is transferred to the refrigerant. After evaporating, a compressor increases the pressure, and in turn, the temperature of the refrigerant. The gas refrigerant is then condensed into a liquid and the excess heat is rejected to the ambient surroundings. The process then repeats.

SUMMARY

A refrigerator appliance includes a cabinet, an inner liner, an anchor assembly, a subcomponent, a fastener, and an insulating material. The cabinet has walls defining an internal cavity. The inner liner is disposed within the internal cavity such that a gap is defined between the walls and the inner liner. The inner liner has an external surface facing toward the gap. The inner liner has an internal surface facing away from the gap on an opposing side of the inner liner relative to the external surface. The inner liner defines a keyed-orifice extending between the external and internal surfaces. The anchor assembly includes a receiving portion and a cover portion. The anchor assembly is secured to the inner liner. The receiving portion is disposed within the keyed-orifice. The receiving portion has a first axial end extending outward from the internal surface. The receiving portion has a second axial end extending outward from the external surface. The receiving portion has tabs extending radially outward at a position that is between the first and second axial ends. The first axial end defines a fastener-receiving orifice. The second axial end has threads. The tabs engage the internal surface. The cover portion is disposed within the gap. The cover portion defines a tapped orifice. The cover portion has a skirt extending radially outward from the tapped orifice. The tapped orifice engages the threads to secure the cover portion to the receiving portion. The skirt engages the external surface and extends about the key-orifice to isolate the keyed-orifice from the gap. The tabs and skirt collectively generate a compression force on the inner liner to secure the anchor assembly to the inner liner. The subcomponent is disposed within the internal cavity. The fastener engages the subcomponent and the fastener-receiving orifice to secure the subcomponent to the anchor assembly. The insulating material is disposed within the gap, between the walls and the inner liner, and over the skirt.

A refrigerator appliance includes a cabinet, a liner, and an anchor assembly. The liner is disposed within the cabinet such that a gap is defined between the cabinet and the liner, and such that a chamber is defined on an opposing side of the liner relative to the gap. The liner defines a keyed-orifice extending between the gap and the chamber. The anchor assembly includes first and second portions. The anchor assembly is secured to the liner. The first portion is disposed within the keyed-orifice. The first portion has a first end extending into the chamber. The first portion has a second end extending into the gap. The first portion has tabs extending radially outward and engaging the liner within the chamber. The first end is configured to engage a subcomponent to secure the subcomponent within the chamber. The second portion is disposed within the gap. The second portion has a hub. The second portion has a skirt extending radially outward from the hub. The hub engages the second end of the first portion via a threaded connection to secure the second portion to the first portion. The skirt engages the liner and extends about the key-orifice to isolate the keyed-orifice from the gap. The tabs and skirt collectively generate a compression force on the inner liner to secure the anchor assembly to the inner liner.

An anchor assembly for securing a subcomponent to a refrigerator includes a receiving portion and a cover portion. The receiving portion has a first end configured to engage the subcomponent, a second end defining threads, and tabs extending radially outward at a position that is between the first and second ends. The cover portion has a hub and a skirt extending radially outward from the hub. The hub is configured to engage the second end of the receiving portion via the threads to secure the second portion to the first portion. The skirt is configured to engage a wall and extend about the keyed-orifice. The tabs and skirt are collectively configured to generate a compression force on the wall to secure the anchor assembly to the wall.

BRIEF DESCRIPTION OF THE DRAWINGS

FIG. 3 is an isometric view of an anchor assembly in an assembled state;

FIG. 4 is an isometric view of the anchor assembly in a disassembled state;

FIG. 5 is a cross-sectional view taken along line 5-5 in FIG. 3;

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
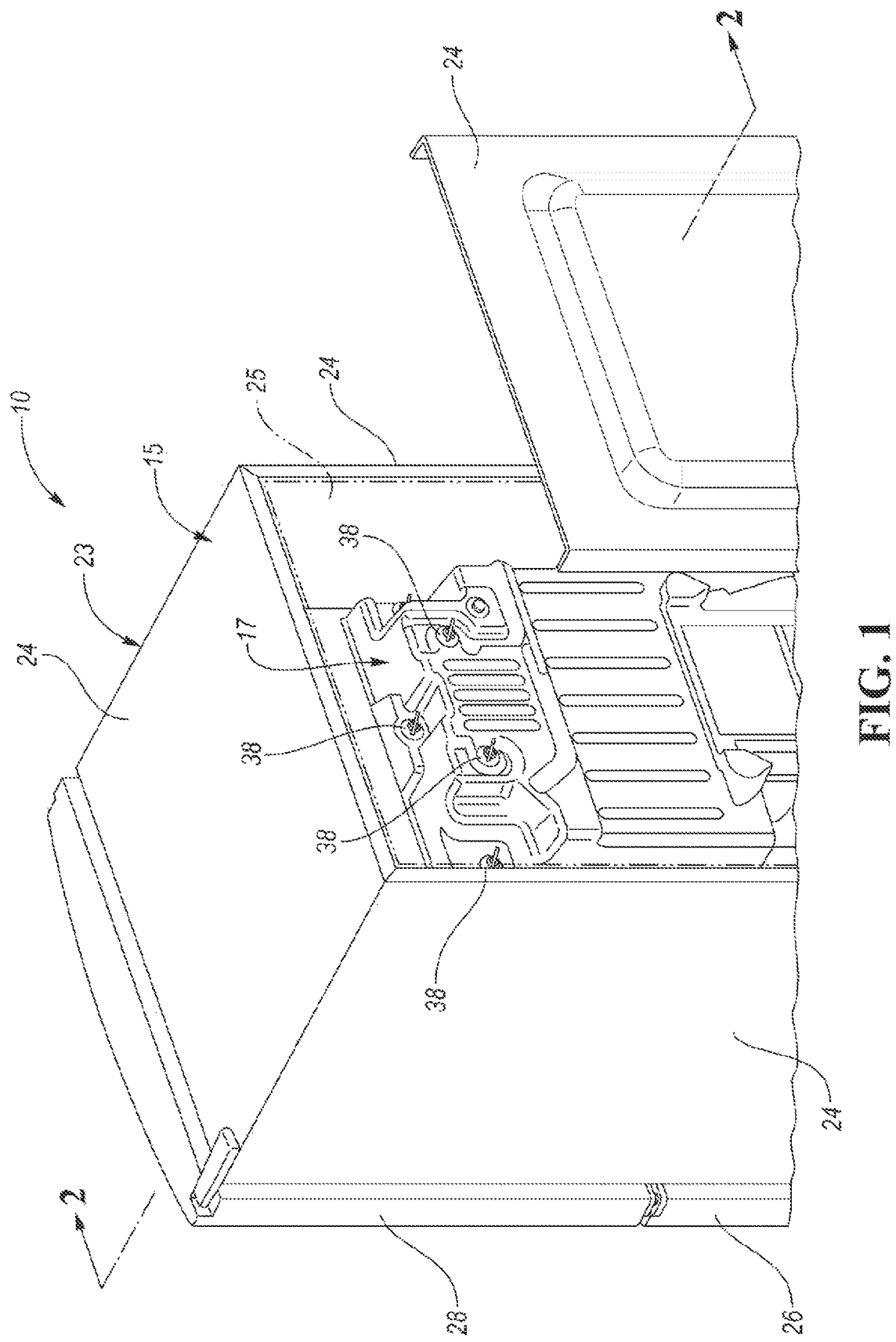
FIG. 1 is a partial rear isometric exploded view of a refrigerator.
Figure 2:
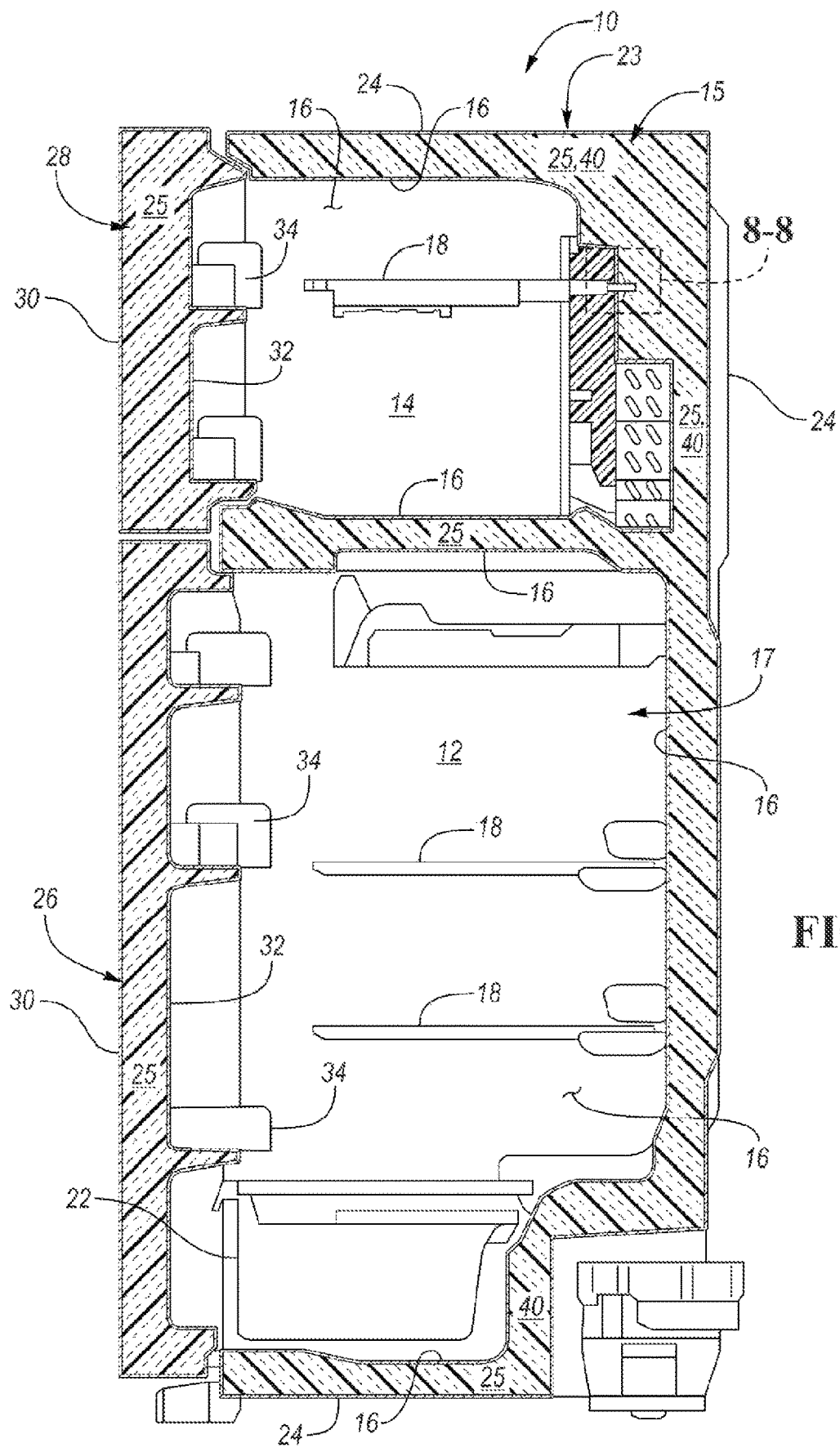
FIG. 2 is a cross-sectional view taken along line 2-2 in FIG. 1.
Figure 6:
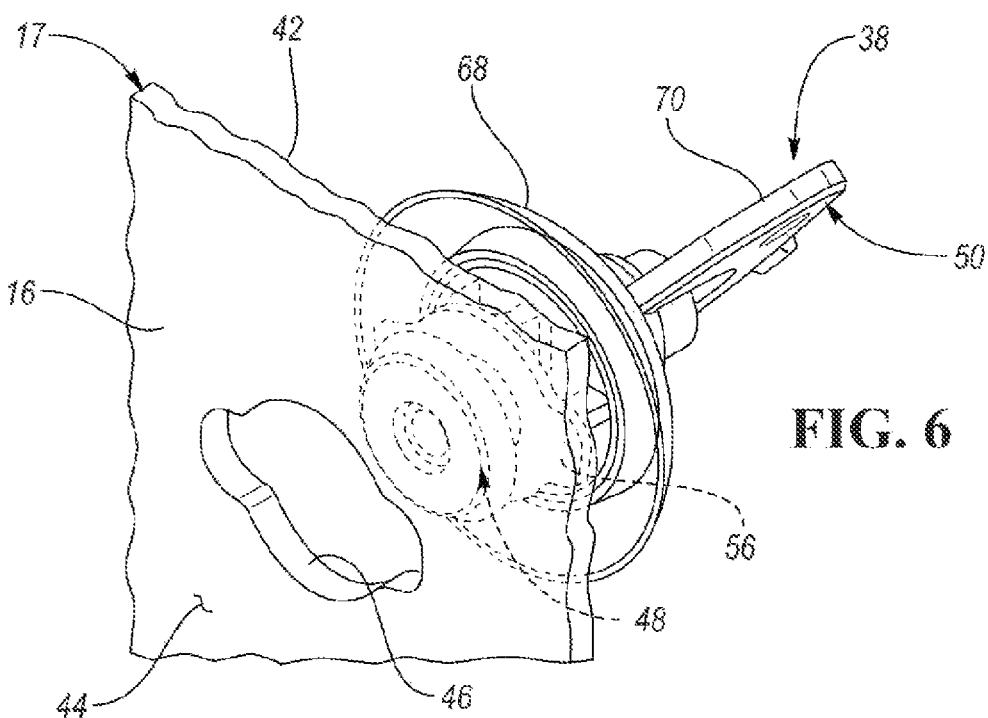
FIGS. 6 and 7 illustrate the engagement between the anchor assembly and a keyed-orifice.
Figure 7:
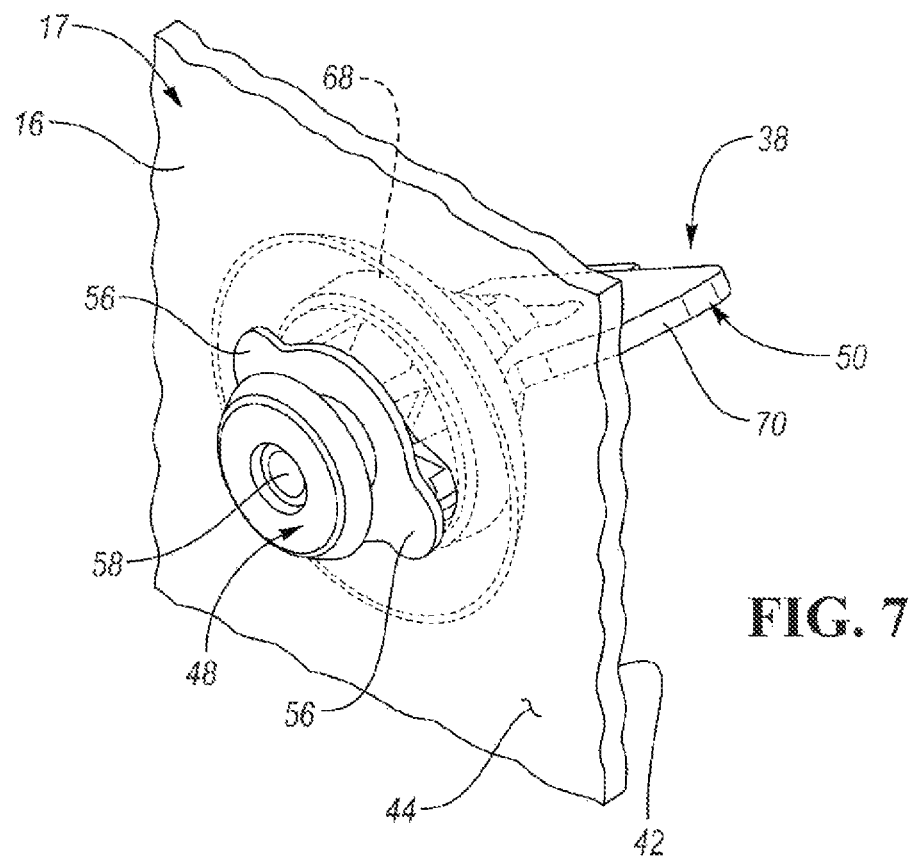

Referring to FIGS. 1 and 2, generally a refrigerator 10 of the top-mount type is illustrated. However, it should be understood that this disclosure could apply to any type of refrigerator, such as a side-by-side, French-Door Bottom Mount, or a bottom-mount type. As shown in FIGS. 1 and 2, the refrigerator 10 may have a first internal cavity, first internal storage chamber, or fresh food compartment 12 configured to refrigerate and not freeze consumables within the fresh food compartment 12, and a second internal cavity, second internal storage chamber, or a freezer compartment 14 configured to freeze consumables within the freezer compartment 14 during normal use. The fresh food compartment 12 and freezer compartment 14 may be defined by a housing or cabinet 15 of the refrigerator 10. It is generally known that the freezer compartment 14 is typically kept at a temperature below the freezing point of water, and the fresh food compartment 12 is typically kept at a temperature above the freezing point of water and generally below a temperature of from about 35° F. to about 50° F., more typically below about 38° F.

The refrigerator 10 includes one or more refrigeration loops (not shown) that are configured to cool the air the within the fresh food compartment 12 and the freezer compartment 14. The refrigeration loop includes at least a compressor, an evaporator that cools air being delivered to the fresh food compartment 12 and/or freezer compartment 14, a condenser that rejects heat to ambient surroundings, and a thermal expansion valve. Fans may be utilized to direct air across the evaporator and the condenser to facilitate exchanging heat. The compressor and the fans may be connected to a controller. Sensors that measure the air temperature within the fresh food compartment 12 and the freezer compartment 14 may be in communication with the controller. The controller may be configured to operate the compressor, fans, etc. in response to the air temperature within the within the fresh food compartment 12 and the freezer compartment 14 being less than a threshold.

Such a controller may be part of a larger control system and may be controlled by various other controllers throughout the refrigerator 10, and one or more other controllers can collectively be referred to as a "controller" that controls various functions of the refrigerator 10 in response to inputs or signals to control functions of the refrigerator 10. The controller may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the refrigerator 10.

The refrigerator 10, or more specifically the cabinet 15, includes panels or internal walls 16 that define the fresh food compartment 12 and the freezer compartment 14. The walls 16 may more specifically form an internal or inner liner 17 of the refrigerator 10. The walls 16 may include a rear or back wall, a top wall, a bottom wall, internal divider walls, and two opposing side walls. One or more shelves 18 may be secured to the walls 16 within the fresh food compartment 12 and/or freezer compartment 14. One or more drawers may be slidably secured to the shelves 18 or the walls 16 within the fresh food compartment 12 and/or freezer compartment 14. One or more crisper drawers 22 may be slidably secured to the shelves 18 or the walls 16 within the fresh food compartment 12. The crisper drawer 22 may more specifically be a drawer defining a storage space that is kept at a desired humidity that may be different from the remainder of the fresh food compartment 12, but that is optimal for maintaining freshness of fruits and vegetables.

The refrigerator 10, or more specifically the cabinet 15, includes an outer shell, frame, or housing 23 that comprises several exterior panels or walls 24. The outer shell, frame, or housing 23 that comprises several exterior panels or walls 24 may also be referred to as the refrigerator cabinet wrapper. The exterior walls 24 may include a rear or back wall, a top wall, a bottom wall, and two side walls. The rear wall of the exterior walls 24 is exploded out in FIG. 1 for illustrative purposes. An insulating material 25, such as an insulating foam, may be disposed between each exterior wall 24 and an adjacent corresponding interior wall 16 in order reduce the heat transfer from the ambient surroundings to the fresh food compartment 12 and the freezer compartment 14, which increases the efficiency of the refrigerator 10. The insulating material 25 may also be disposed between opposing exterior surfaces of internal divider walls within the cabinet (e.g., a divider wall that is disposed between the fresh food compartment 12 and the freezer compartment 14). The cabinet 15 (or more specifically the outer housing 23 or the exterior walls 24) may define an internal cavity. The inner liner 17 (or more specifically the interior walls 16) and the insulating material 25 are disposed within the internal cavity defined by the outer housing 23 or the exterior walls 24. The inner liner 17 (or more specifically the interior walls 16) may in turn define the fresh food compartment 12 and the freezer compartment 14 within the internal cavity defined by the outer housing 23 or the exterior walls 24. Each exterior wall 24, adjacent corresponding interior wall 16, and the insulating material 25 disposed between each exterior wall 24 and adjacent corresponding interior wall 16 may collectively be referred to as a single wall of the cabinet 15 of the refrigerator. The insulating material 25 is shown in phantom lines in FIG. 1 for illustrative purposes.

The refrigerator 10 may have one or more doors 26, 28 that provide selective access to the interior volume of the refrigerator 10 where consumables may be stored. As shown, the fresh food compartment door is designated 26, and the freezer door is designated 28. The doors 26, 28 may be rotatably secured to the frame or housing 23 of the refrigerator 10 by one or more hinges. Alternatively, one or more of the doors 26, 28 may be configured to slide into and out of the cabinet 15.

The doors 26, 28 may each include an exterior panel 30 and an interior panel 32 that is disposed on an internal side of the respective exterior panel 30 of each door 26, 28. The interior panels 32 may be configured to face the fresh food compartment 12 and freezer compartment 14 when the doors 26, 28 are in closed positions. The interior panels 32 may more specifically be door liners. The insulating material 25 may be disposed between the exterior panels 30 and an adjacent corresponding interior panel 32 of each door 26, 28 in order reduce the heat transfer from the ambient surroundings and increase the efficiency of the refrigerator 10.

The doors 26, 28 may also include storage bins 34 that are able to hold food items or containers. The storage bins 34 may be secured to the interior panels 32 of each door 26, 28. Alternatively, the storage bins 34 may be integrally formed within or defined by the interior panels 32 of each door 26, 28. In yet another alternative, a portion of the storage bins 34 may be secured to the interior panels 32 of the doors 26, 28, while another portion of the storage bins 34 may be integrally formed within or defined by the interior panels 32 the doors 26, 28. The storage bins 34 may include shelves (e.g., a lower surface upon, which a food item or container may rest upon) that extend from back and/or side surfaces of the interior panels 32 of the doors 26, 28.

Referring to FIGS. 3-8, a mounting system for the subcomponents 36 of the refrigerator 10, which includes a fastening anchor or anchor assembly 38, is illustrated. The anchor assembly 38 may be referred to as an anchor. The subcomponent 36 may be a portion (e.g., a mounting bracket, a mounting rail, support arm, etc.) of a shelf 18 or drawer 22 that is disposed within the fresh food compartment 12 or the freezer compartment 14. The subcomponent 36 may alternatively be an internal panel (e.g., a panel that forms part a channel that directs cooled air into or out of the fresh food compartment 12 or the freezer compartment 14), a block of insulating material, or any other subcomponent of the refrigerator, such as an ice maker, an ice container track, a motor (e.g., for a refrigerant compressor, fan, or ice maker mechanism), an air diffuser, a water tank, a heat exchanger (e.g., a condenser or evaporator), a fan (e.g., a fan that directs air across an evaporator or condenser and corresponding mounting hardware or bracketry), an air duct, or the corresponding mounting hardware/bracketry for any of the subcomponents. The mounting system may be utilized in appliances other than a refrigerator.

Figure 8:
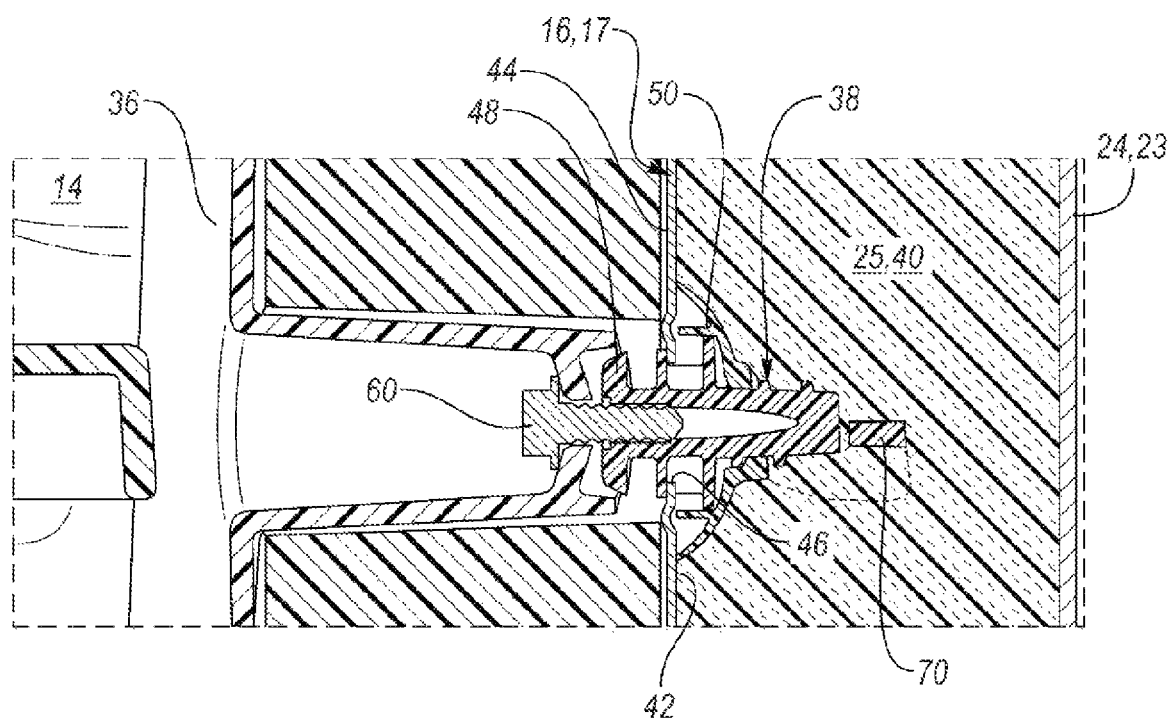
FIG. 8 is a magnified view of area 8-8 in FIG. 2.
Figure 9:
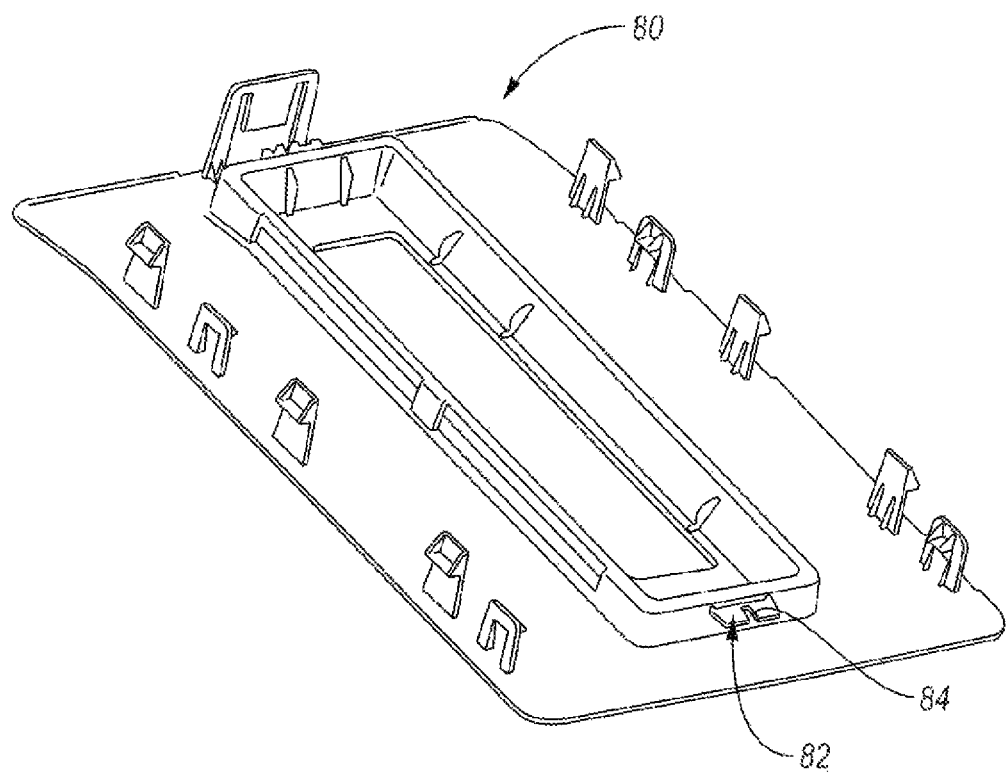
FIG. 9 is an isometric view of an internal panel of the refrigerator.
Figure 11:
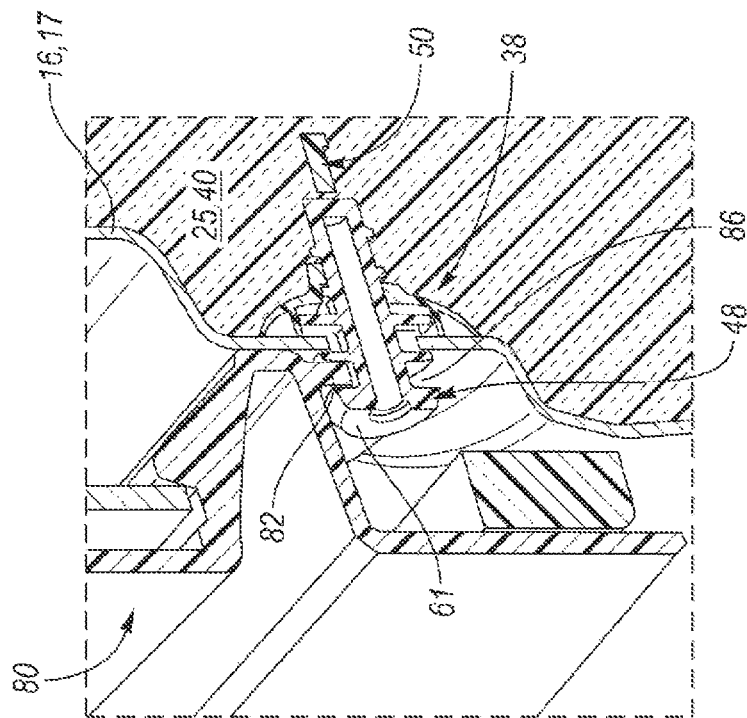
FIG. 11 is a magnified view of area 11-11 in FIG. 10.
Figure 10:
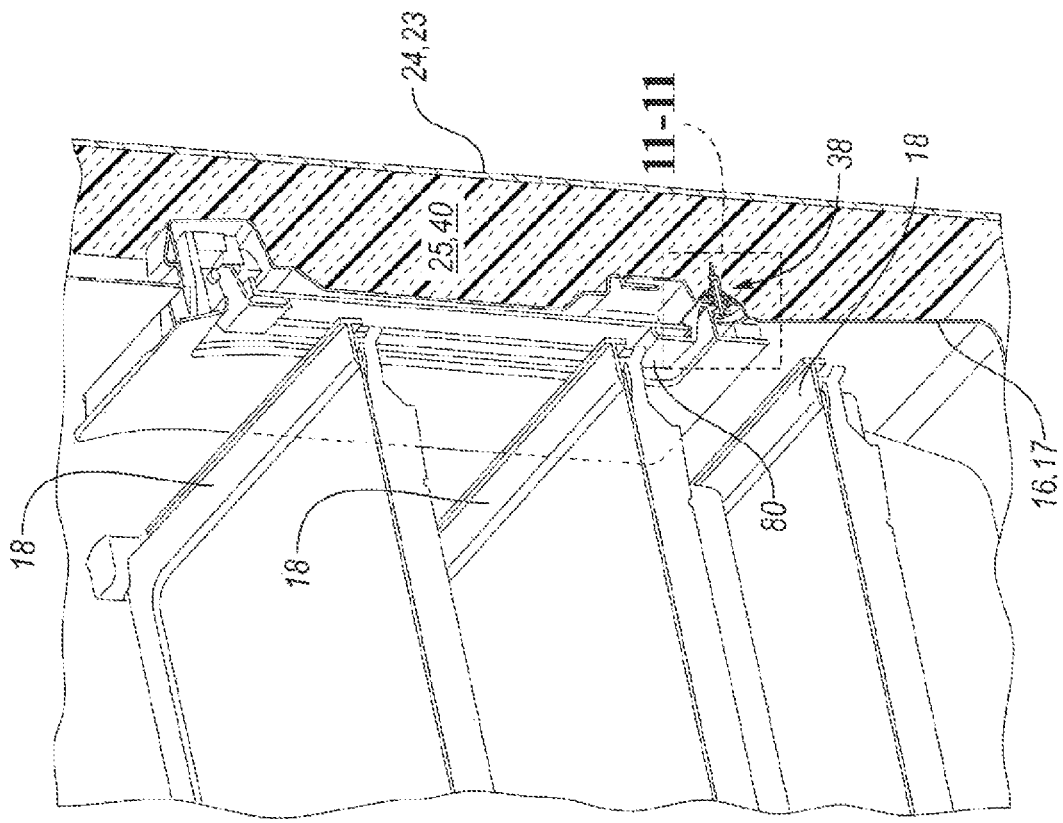
FIG. 10 is a cross-sectional view illustrating an engagement between the internal panel and the anchor assembly.

FIG. 8 includes a cross-sectional view through one of the walls of the cabinet 15 of the refrigerator 10. Although FIG. 8 is a magnified view of area 8-8 from FIG. 2, the wall illustrated in FIG. 8 may be representative of any of the walls of the cabinet 15 illustrated in FIGS. 1 and 2. The wall may include one of the exterior walls 24 that is part of the outer housing 23 of the cabinet 15 and a corresponding interior wall 16 that is part of the inner liner 17 of the refrigerator 10. Alternatively, the wall illustrated in FIG. 8 may be an internal wall within the refrigerator 10 (e.g., the wall may be a dividing wall between the food compartment 12 and freezer compartment 14, or some other internal wall that is within the fresh food compartment 12 or freezer compartment 14).

A gap 40 may be formed between the exterior walls 24 and the interior walls 16. The insulating material 25 may be disposed in the gap 40 between one or more of the exterior walls 24 and adjacent corresponding interior walls 16 in order reduce the heat transfer from the ambient surroundings to the fresh food compartment 12 and the freezer compartment 14. The fresh food compartment 12 and the freezer compartment 14 may be defined by the inner liner 17 (or more specifically the interior walls 16) on an opposing side of the inner liner 17 relative to the gap 40. The subcomponent 36 is illustrated as being disposed within the fresh freezer compartment 14. Alternatively, the subcomponent 36 may be disposed within the fresh food compartment 12, or other internal cavity defined at some position within cabinet 15.

The inner liner 17 has an external surface 42 facing toward the gap 40. The inner liner 17 has an internal surface 44 facing away from the gap 40 on an opposing side of the inner liner 17 relative to the external surface 42. The internal surface 44 faces toward a chamber (e.g., the food compartment 12, the freezer compartment 14, or other chamber that may be occupied by a subcomponent of the refrigerator 10) that is on an opposing side of the inner liner 17 relative to the gap 40. The inner liner 17 defines one or more keyed-orifices 46 extending between the external surface 42 and internal surface 44. The one or more keyed-orifices 46 may also be said to extend between the gap 40 and the chamber that is on the opposing side of the inner liner 17 relative to the gap 40.

The anchor assembly 38 may be secured to the inner liner 17 once installed. More specifically, the anchor assembly 38 may be secure to one of the interior walls 16 once installed. The anchor assembly 38 includes a receiving portion 48 and cover portion 50. The receiving portion 48 and cover portion 50 may be referred to as the first and second portions, respectively, or vice versa. The receiving portion 48 may be disposed within a keyed-orifice 46. The receiving portion 48 has a first axial end 52 and a second axial end 54. The first axial end 52 is configured to extend outward from the internal surface 44 of the inner liner 17 and into the chamber that is on an opposing side of the inner liner 17 relative to the gap 40 once installed. The second axial end 54 is configured to extend outward from the external surface 42 of the inner liner 17 and into the gap 40 once installed.

The receiving portion 48 further includes wings or tabs 56 extending radially outward at a position that is between the first axial end 52 and the second axial end 54. The tabs 56 are configured to engage the internal surface 44 of the inner liner 17 within the chamber that is on an opposing side of the inner liner 17 relative to the gap 40 once installed in order to prevent removal of the receiving portion 48 from the keyed-orifice 46. More specifically, the tabs 56 may align with the shape of the keyed-orifice 46 when being inserted into the keyed-orifice 46 and then may be rotated so that there is interference between the tabs 56 and the inner liner 17 (or more specifically one of the interior walls 16) along the internal surface 44 such that the receiving portion 48 cannot be retracted without further rotation to realign the tabs 56 with the shape of the keyed-orifice 46. The first axial end 52 is configured to engage the subcomponent 36 to secure the subcomponent to the inner liner 17 (or more specifically one of the interior walls 16) within the chamber that is on an opposing side of the inner liner 17 relative to the gap 40. More specifically, the first axial end 52 may define a fastener-receiving orifice 58 and a fastener 60 may engage the subcomponent 36 and the fastener-receiving orifice 58 to secure the subcomponent 36 to the anchor assembly 38. The first axial end 52 of the receiving portion 48 may include a head 61 that defines the fastener-receiving orifice 58. The second axial end 54 of the receiving portion may have threads 62.

The cover portion 50 is disposed within the gap 40. The cover portion 50 defines a tapped orifice 64. More specifically the cover portion 50 has hub 66 that defines the tapped orifice 64. The cover portion 50 further includes a skirt 68 that extends radially outward from the hub 66 and the tapped orifice 64. The hub 66 is configured to engage the second axial end 54 of the receiving portion 48 to secure the cover portion 50 to the receiving portion 48. More specifically, the hub 66 may be configured to engage the second axial end 54 of the receiving portion 48 via a threaded connection (e.g., an engagement between the threads 62 and the tapped orifice 64) to secure the cover portion 50 to the receiving portion 48. In an alternative embodiment, the threaded connection may be reversed (i.e., the cover portion 50 may have threads while the receiving portion 48 defines a tapped orifice).

The skirt 68 is configured to engage the inner liner 17 (or more specifically one of the interior walls 16) and extend about the key-orifice 46 to isolate the keyed-orifice 46 from the gap 40. More specifically, the skirt 68 is configured to engage the external surface 42 of the inner liner 17 and extend about the key-orifice 46 to isolate the keyed-orifice 46 from the gap 40. The skirt 68 may function to prevent the insulating material 25 from spilling into the chamber that is on an opposing side of the inner liner 17 relative to the gap 40 while the gap 40 is being filled with the insulating material during manufacturing. The insulating material 25 may be a liquid or liquid-like material during installation that solidifies after installation. Once installed, the insulating material 25 may be disposed over and cover the skirt 68.

In response to tightening the threaded connection (e.g., the engagement between the threads 62 and the tapped orifice 64), the tabs 56 and skirt 68 may collectively generate a compression force on the inner liner 17 (or more specifically one of the interior walls 16) to secure the anchor assembly 38 to the inner liner 17. The relative axial travel (e.g., the travel in a direction that extends between the first axial end 52 and the second axial end 54 of the receiving portion 48) of the receiving portion 48 and the cover portion 50 along the threaded connection allows for an adjustment of a distance between the tabs 56 and skirt 68 such that anchor assembly 38 may be secured to different walls having varying thickness.

The cover portion 50 further includes tabs or wings 70 to facilitate engagement of threaded connection (e.g., the engagement between the threads 62 and the tapped orifice 64) during installation of the cover portion 50 onto the receiving portion 48. More specifically, the wings 70 provide a position for an individual grab or engage while installing the cover portion 50 onto the receiving portion 48. The wings 70 may also provide leverage to increase the torque being applied to the threaded connection during installation. The wings 70 operate in a similar manner as the protrusions or wings that extend outward from a wingnut.

The receiving portion 48 may include a pair of substantially parallel plates 72 that extend radially outward. One of the plates may include the tabs 56. Substantially parallel may refer to any incremental angle that is between exactly parallel and 15° from exactly parallel. The substantially parallel plates 72 are disposed between the first axial end 52 and the second axial end 54 of the receiving portion 48. The substantially parallel plates 72 define at least one chamber 74 therebetween. The at least one chamber 74 is configured to receive leakage of the insulating material during installation of the insulating material 25 into the gap 40. More specifically, some the insulating material 25 may blowby the threaded connection or the skirt 68 during installation, and the at least one chamber 74 provides a place to receive the insulating material 25 so that it does not flow through the keyed-orifice 46 and into the chamber that is on an opposing side of the inner liner 17 relative to the gap 40. The receiving portion 48 may also include support beams 76 extending between the plates of the pair of substantially parallel plates 72 to provide structural support to the pair of substantially parallel plates 72. A secondary chamber 78 may be defined between one of the plates the pair of substantially parallel plates 72 and the skirt 68. The secondary chamber 78 may be further configured to receive leakage of the insulating material 25 during installation of the insulating material 25 into the gap 40.

Referring to FIGS. 3-5 and 9-11 a secondary type of connection between the anchor assembly 38 and a subcomponent of the refrigerator 10 is illustrated. More specifically, the secondary component may be an internal panel 80 that may form part of an air duct that is either configured to deliver air too or draw air from the fresh food compartment 12 or the freezer compartment 14. The internal panel 80 may have a tab 82 defining a notch 84. The tab 82 and notch 84 may form a fork-shaped structure. The first axial end 52 of the receiving portion 48 includes the head 61. A notch 86 is defined between the head 61 and the tabs 56. The notch 86 may also be defined between the head 61 and one of the plates of the pair of substantially parallel plates 72. The notch 86 is configured to receive a portion (e.g., the fork-shaped structure) of the subcomponent (e.g., the internal panel 80) to secure the subcomponent to the first axial end 52 of the receiving portion 48.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed. For example, the refrigerator 10 may include multiple anchor assemblies 38 that are utilized to mount a multitude of subcomponents of the refrigerator 10 to the inner liner 17 or other structure of the refrigerator 10 (e.g., See anchor assemblies 38 in FIG. 1).

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A refrigerator appliance comprising:
   a cabinet having walls defining an internal cavity;
   an inner liner (i) disposed within the internal cavity such that a gap is defined between the walls and the inner liner, (ii) having an external surface facing toward the gap, (iii) having an internal surface facing away from the gap on an opposing side of the inner liner relative to the external surface, and (iv) defining a keyed-orifice extending between the external and internal surfaces;
   an anchor assembly secured to the inner liner, the anchor assembly having,
      a receiving portion (i) disposed within the keyed-orifice, (ii) having a first axial end extending outward from the internal surface, (iii) having a second axial end extending outward from the external surface, and (iv) having tabs extending radially outward at a position that is between the first and second axial ends, wherein (a) the first axial end defines a fastener-receiving orifice, (b) the second axial end has threads, and (c) the tabs engage the internal surface, and a cover portion (i) disposed within the gap, (ii) defining a tapped orifice, and (iii) having a skirt extending radially outward from the tapped orifice, wherein (a) the tapped orifice engages the threads to secure the cover portion to the receiving portion, (b) the skirt engages the external surface and extends about the keyed-orifice to isolate the keyed-orifice from the gap, and (c) the tabs and skirt collectively generate a compression force on the inner liner to secure the anchor assembly to the inner liner;

a subcomponent disposed within the internal cavity;

a fastener engaging the subcomponent and the fastener-receiving orifice to secure the subcomponent to the anchor assembly; and an insulating material (i) disposed within the gap, (ii) between the walls and the inner liner, and (iii) over the skirt.

2. The refrigerator appliance of claim 1, wherein the cover portion includes wings to facilitate engagement between the tapped orifice and the threads during installation of the cover portion onto the receiving portion.

3. The refrigerator appliance of claim 1, wherein the receiving portion includes a pair of substantially parallel plates (i) extending radially outward, (ii) disposed between the first and second axial ends, and (iii) defining at least one chamber therebetween configured to receive leakage of the insulating material during installation of the insulating material into the gap.

4. The refrigerator appliance of claim 3, wherein the receiving portion includes support beams extending between the plates of the pair of substantially parallel plates.

5. The refrigerator appliance of claim 3, wherein a secondary chamber is defined between one of the plates the pair of substantially parallel plates and the skirt, and wherein the secondary chamber is further configured to receive the leakage of the insulating material during installation of the insulating material into the gap.

6. The refrigerator appliance of claim 1, wherein the receiving portion includes a head that defines the fastener-receiving orifice.

7. A refrigerator appliance comprising:
a cabinet;
a liner (i) disposed within the cabinet such that a gap is defined between the cabinet and the liner, and such that a chamber is defined on an opposing side of the liner relative to the gap and (ii) defining a keyed-orifice extending between the gap and the chamber; and
an anchor assembly secured to the liner, the anchor assembly having,
a first portion (i) disposed within the keyed-orifice, (ii) having a first end extending into the chamber, (iii) having a second end extending into the gap, and (iv) having tabs extending radially outward and engaging the liner within the chamber, wherein the first end is configured to engage a subcomponent to secure the subcomponent within the chamber, and
a second portion (i) disposed within the gap, (ii) having a hub, and (iii) having a skirt extending radially outward from the hub, wherein (a) the hub engages the second end of the first portion via a threaded connection to secure the second portion to the first portion, (b) the skirt engages the liner and extends about the keyed-orifice to isolate the keyed-orifice from the gap, and (c) the tabs and skirt collectively generate a compression force on the liner to secure the anchor assembly to the liner.

8. The refrigerator appliance of claim 7, wherein the second portion includes wings to facilitate engagement between the hub and the second end via the threaded connection during installation of the second portion onto the first portion.

9. The refrigerator appliance of claim 7, wherein the first portion includes a pair of substantially parallel plates (i) extending radially outward, (ii) disposed between the first and second ends, and (iii) defining at least one chamber therebetween configured to receive leakage of an insulating material during installation of the insulating material into the gap.

10. The refrigerator appliance of claim 9, wherein the first portion includes support beams extending between the plates of the pair of substantially parallel plates.

11. The refrigerator appliance of claim 9, wherein a secondary chamber is defined between one of the plates the pair of substantially parallel plates and the skirt, and wherein the secondary chamber is further configured to receive the leakage of the insulating material during installation of the insulating material into the gap.

12. The refrigerator appliance of claim 7, wherein the first end of the first portion defines an orifice.

13. The refrigerator appliance of claim 12 further comprising a fastener, wherein the fastener engages the subcomponent and the orifice to secure the subcomponent to the first end of the first portion.

14. The refrigerator appliance of claim 7, wherein (i) the first end of the first portion includes a head, (ii) a notch is defined between the head and the tabs, and (iii) the notch is configured to receive a portion of the subcomponent to secure the subcomponent to the first end of the first portion.

15. A refrigerator appliance comprising:
a wall defining a keyed-orifice;
a subcomponent; and
an anchor assembly configured to secure the subcomponent to the wall, the anchor assembly comprising,
a receiving portion having (i) a first end configured to engage the subcomponent, (ii) a second end having threads, and (iii) tabs extending radially outward at a position that is between the first and second ends, and
a cover portion having (i) a hub and (ii) a skirt extending radially outward from the hub, wherein (a) the hub is configured to engage the second end of the receiving portion via the threads to secure the cover portion to the receiving portion, (b) the skirt is configured to engage the wall and extend about the keyed-orifice, and (c) the tabs and skirt are collectively configured to generate a compression force on the wall to secure the anchor assembly to the wall.

16. The refrigerator appliance of claim 15, wherein the cover portion includes wings to facilitate engagement between the hub and the second end of the receiving portion via the threads during installation of the cover portion onto the receiving portion.

17. The refrigerator appliance of claim 15, wherein the receiving portion includes a pair of substantially parallel plates (i) extending radially outward, (ii) disposed between the first and second ends, and (iii) defining at least one chamber therebetween configured to receive leakage of insulating material during installation of the insulating material onto the refrigerator.

18. The refrigerator appliance of claim 17, wherein a secondary chamber is defined between one of the plates the pair of substantially parallel plates and the skirt, and wherein the secondary chamber is further configured to receive the leakage of the insulating material during installation of the insulating material onto the refrigerator.

19. The refrigerator appliance of claim 15, wherein (i) the first end of the receiving portion includes a head, (ii) a notch is defined between the head and the tabs, and (iii) the notch is configured to receive a portion of the subcomponent to secure the subcomponent to the first end of the receiving portion.

20. The refrigerator appliance of claim 15, wherein the receiving portion includes a head that defines a fastener-receiving orifice.

* * * * *